United States Patent [19]

Horigome et al.

[11] Patent Number: 4,727,748
[45] Date of Patent: Mar. 1, 1988

[54] METHOD AND APPARATUS FOR DETECTING LEAKS IN A GAS PIPE LINE

[75] Inventors: Hidekazu Horigome; Takahiro Onishi, both of Yokohama; Makoto Yamagishi, Kawasaki, all of Japan

[73] Assignee: Nippon Kokan Kabushiki Kaisha, Tokyo, Japan

[21] Appl. No.: 812,911

[22] Filed: Dec. 23, 1985

[30] Foreign Application Priority Data

Dec. 25, 1984 [JP] Japan .................. 59-275257
Dec. 25, 1984 [JP] Japan .................. 59-275258

[51] Int. Cl.<sup>4</sup> .............................................. G01M 3/26
[52] U.S. Cl. .................................... 73/40; 73/40.5 R
[58] Field of Search .................. 73/40, 40.5 R, 49.1; 340/605; 364/510, 509

[56] References Cited

U.S. PATENT DOCUMENTS

| | | | |
|---|---|---|---|
| 3,105,882 | 10/1963 | Meyer | 73/40.5 R |
| 3,105,883 | 10/1963 | Higson, Jr. | 73/40.5 R |
| 3,505,513 | 4/1970 | Fowler et al. | 73/40.5 R |
| 3,695,094 | 10/1972 | Hulme | 73/40.5 R |
| 3,702,074 | 11/1972 | Mullen | 73/40.5 R |
| 3,723,987 | 3/1973 | Barone et al. | 340/605 |
| 3,987,662 | 10/1976 | Hara et al. | 73/40.5 R |
| 4,090,179 | 5/1978 | Hirano | 73/40.5 R |
| 4,280,356 | 7/1981 | Stewart | 73/40.5 R |
| 4,306,466 | 12/1981 | Fukuda | 73/40.5 R |
| 4,308,746 | 1/1982 | Covington | 73/40.5 R |
| 4,404,843 | 9/1983 | Johnson et al. | 73/40.5 R |
| 4,437,336 | 3/1984 | Abe | 73/40.5 R |

FOREIGN PATENT DOCUMENTS

| | | | |
|---|---|---|---|
| 2603715 | 8/1977 | Fed. Rep. of Germany | 73/40.5 R |
| 100730 | 6/1983 | Japan | 73/40.5 R |
| 211100 | 12/1983 | Japan | 73/40.5 R |

Primary Examiner—Stewart J. Levy
Assistant Examiner—Hezron E. Williams
Attorney, Agent, or Firm—Fleit, Jacobson, Cohn & Price

[57] ABSTRACT

A leak detecting method and apparatus for a gas pipe line in which the inflow rate Qin or the outflow rate Qout is measured from instant to instant at each of all the inlet and outlet ports of the gas pipe line and the presence or absence of a gas leak is determined in accordance with the measured values. The measured inflow rates Qin and outflow rates Qout are respectively integrated over a given period of time and the occurrence of a gas leak is determined when the sum $\Sigma \int Qdt$ of the integrated values deviates from a predetermined value. On that occasion, in accordance with the data obtained by these calculations the relation between the integration time and the standard deviation of $\int Qindt - \int Qoutdt / \int Qindt$ is calculated so that in accordance with the relation an integration time T corresponding to a rate of leakage to be detected is determined and the integration over time is performed from each of a plurality of time instants shifted from each other by an integral fraction of the integration time T whereby the above-mentioned determination is made each time the integration time T is reached.

3 Claims, 17 Drawing Figures

METHOD AND APPARATUS FOR DETECTING LEAKS IN A GAS PIPE LINE

BACKGROUND OF THE INVENTION

The present invention relates to a gas pipe line leak detecting method and apparatus for detecting gas leaks in a gas pipe line.

While various leak detecting methods have been proposed in the past for use with liquid transportation pipe lines, there exist the following great differences between the liquid transportation pipe line and the gas pipe line and therefore the leak detecting methods heretofore proposed for use with liquid transportation lines cannot be applied as such to the gas pipe line.

(a) Firstly, gas is a compressible fluid and therefore the line pack quantity of the gas in the pipe line suffers dynamic variations. As a result, there occur the following phenomena which are not encountered in the liquid pipe line. For instance, a considerable time is required for the effect of a change in the pressure, flow rate or the like at one end of the pipe to appear at the other end. Moreover, this effect arrives in a considerably decreased form at the other end due to its attenuation and diffusion in the course of its propagation through the pipe line. Of course, it is impossible to synchronize the two events and also the effect does not simply appear at the other end with a given time delay.

(b) A change in the pressure, flow rate or the like due to the occurrence of a leak is much smaller than that in the case of a liquid and also the attenuation is so large that it is extremely difficult to distinguish such change from various phenomena which always occur under the ordinary operating conditions. In addition, the propagation time of the change is extremely slow as compared with the case of the liquid. Thus, the detection of a leak in the gas pipe line has been performed in the following ways.

The conventional methods have been mainly of the type which effects the detection of a gas leak by the use of a gas detector including a sensor for directly sensing a leaked gas component. It has been the prevailing practice so that the gas detector is installed at a place having a high probability of a leaked gas floating in the case of a yard, the gas detector is mounted within the valve house in the case of a gas pipe line or a patrol car equipped with the detector makes the round for monitoring purposes.

Also, a report has been made of a method in which a sound generated at a leak by a leaking gas is picked up by a portable microphone.

From the operation standpoint of a gas pipe line, it has been the usual practice so that the pressure is measured at the dispatching base, destination base or midway point of the gas pipe line and compared with its predetermined upper and lower limit values thereby indirectly determining any leak upon detection of an abnormal condition and generally only the detection of large leakage is possible. Also, the predetermined values are frequently dependent on the personal experience of the operator.

However, these conventional methods require much labor for the detection in cases where the leakage gas is detected directly by the sensor or the leakage sound is picked up and there is another disadvantage that the amounts of leakage that can be detected by monitoring the pressure lower limit value are limited to very large amounts of leakage.

SUMMARY OF THE INVENTION

The present invention has been made to overcome the foregoing deficiencies in the prior art and it is the primary object of the present invention to provide a leak detecting method and apparatus for a gas pipe line capable of positively detecting a gas leak in the gas pipe line.

In accordance with the invention there are thus provided a leak detecting method and apparatus so designed that the inflow rate Qin or the outflow rate Qout is measured from moment to moment at each of all the inlets and outlets of the gas pipe line and the measured inflow rates Qin and outflow rates Qout are respectively integrated over a given time thereby determining the occurrence of a leak when the sum $\Sigma$SQdt of the integrated values deviates from a predetermined value. The determination is made by calculating the relation between the integration time and the standard deviation of $(\int Qindt - \int Qoutdt)/\int Qindt$ (hereinafter referred to as an FD*) from the data obtained by the previously mentioned calculations, determining an integration time T for a leakage rate to be detected on the basis of the calculated relation and performing an integration over time from each of a plurality of time instants shifted from each other by an integral fraction of the integration time T thereby determining the presence or absence of a leak upon reaching the integration time T.

In other words, the present invention utilizes the fact that the above-mentioned sum $\Sigma \int Qdt$ (hereinafter referred to as an FD) varies within a specified range when the gas pipe line is in the normal condition and the FD deviates from this specified variation range when a gas leak occurs in the gas pipe line. Thus, in accordance with the invention, when the value of FD deviates from a given value, it is determined that there is a gas leak and an alarm signal is generated.

Thus, the invention does not require much labor as in the case of the conventional methods in which the detection of a leak is effected directly by the use of a leak gas sensor or the detection is effected by picking up a leakage sound.

Also, it is possible to positively detect the occurrence of a leak which is much smaller than in the case of the detection effected by monitoring the pressure lower limit value. Also, the pipe line can be continuously monitored over its whole length and the detection of a leak can be effected by any person without having recourse to the experience of the operator.

In accordance with another aspect of the leak detecting method and apparatus for a gas pipe line according to the invention, the inflow rate Qin or the outflow rate Qout is measured from instant to instant at each of all the inlets and outlets ports of the gas pipe line whereby in accordance with the thus measured flow rates Qin and outflow rates Qout and inflow and outflow rates obtained by a simulation of transient flow in the gas pipe line, the occurrence of a gas leak is determined when the difference between the two exceeds a predetermined value. In other words, the invention utilizes the fact that the difference between an FD calculated from the measured values and an FD obtained by a simulation is held within a given range when the gas pipe line is in the noraml condition whereby when the difference exceeds a given value, the occurrence of a gas leak is determined and an alarm signal is generated.

Thus, in accordance with the invention, by virtue of the fact the difference between an FD calculated from measured values and an FD obtained by a simulation is obtained so that the occurrence of a gas leak is determined when the difference is greater than a given value, when a leak occurs, it is detected immediately and this is much effective in ensuring safety.

Other objects and advantages of the invention will be apparent from the following description, the appending claims and accompanying drawings.

DESCRIPTION OF THE PREFERRED EMBODIMENTS

Figure 1:
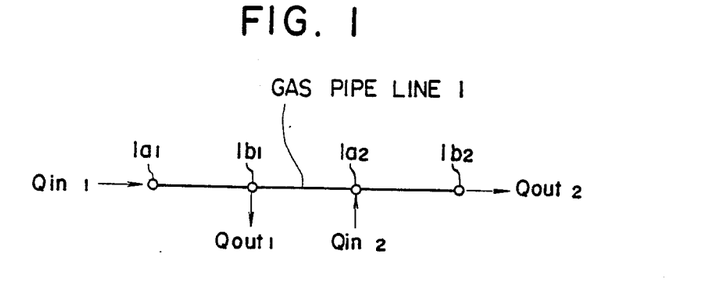
FIG. 1 is a diagram showing a gas pipe line model.

FIG. 1 is a diagram showing a gas pipe line model. In the Figure, symbols $Qin_1$ and $Qin_2$ designate inflow rates at inlets $1a_1$ and $1a_2$, respectively, and $Qout_1$ and $Qout_2$ outflow rates at outlets $1b_1$ and $1b_2$, respectively.

Figure 2:
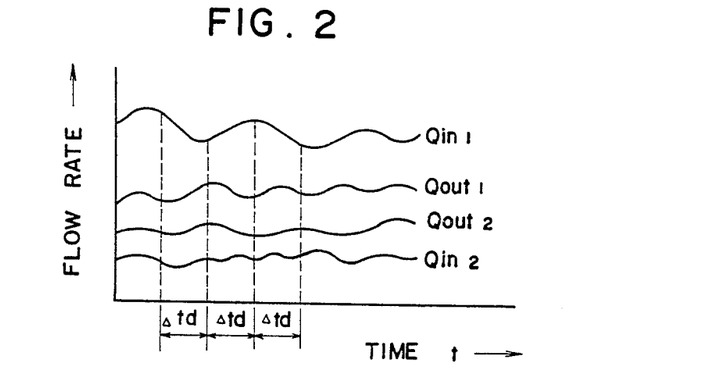
FIG. 2 is a graph showing variations of the flow rates with time.

FIG. 2 is a graph showing the behaviors of the flow rates with time which were obtained by measuring the inflow rates $Qin_1$ and $Qin_2$ and the outflow rates $Qout_1$ and $Qout_2$ from instant to instant, with the abscissa showing the time and the ordinate showing the flow rate. As shown in the Figure, the flow rates considerably depend on the capacity at the supply, the changes in the consumption rate, etc.

Figure 3:
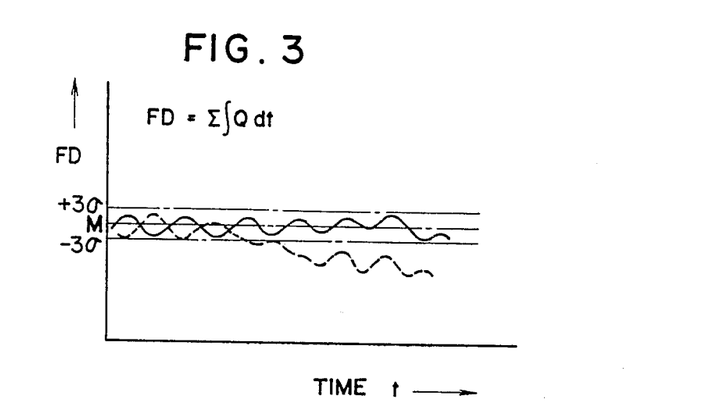
FIG. 3 is a graph showing an FD variation with time.

FIG. 3 is a graph showing the variation of the FD, with the ordinate representing the FD and the abscissa representing the time. As shown in the Figure, the value of FD fluctuates within a specific range $3\sigma$ when the gas pipe line is in the normal condition. When a gas leak occurs in the gas pipe line, its mean value M deviates as shown by the broken line. Thus, it is possible to determine the occurrence of a gas leak when the mean value M deviates from the specific range $3\sigma$. Here, it is assumed that the set of the FD values has a normal distribution.

Figure 4:
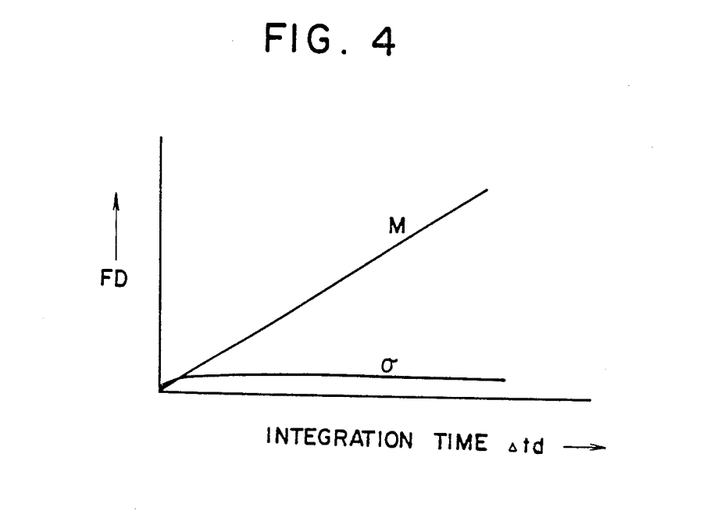
FIG. 4 is a graph showing the relation between the mean value and standard deviation of the FD and the integration time.

It is considered that the mean value M of FD includes an FD due to a gas leak varying with the integration time and an FD due to an instrumental error of the metering system and that the standard deviation value of FD representing the distribution of FD including an FD due to a fluctuation in the line pack gas quantity of the pipe line, an FD due to a repeatability of the flow meters and an FD due to an accuracy of the flow meters. These values are given with respect to the integration time $\Delta td$ as shown in FIG. 4. Namely, it is considered that the mean value M is represented by a straight line which substantially increases linearly and the standard deviation $\sigma$ saturates at a certain point but finally approaches near to zero. In FIG. 4, the abscissa represents the integration time and the ordinate represents the FD.

Here $FD = \Sigma \int Qdt = \int Qindt - \int Qoutdt$ where
$\int Qindt$ = the sum of the integrated values of the inflow rates over a period of time
$\int Qoutdt$ = the sum of the integrated values of the outflow rates over a period of time.

Then, with the graph of FIG. 4, the greater the integration time $\Delta td$ is, the greater the mean value m is and it becomes hard to make out. Thus, in the graph of FIG 5 the ordinate represents the value obtained by dividing the value of FD by the value of $\int Qindt$. This $FD/\int Qindt$ is referred to as an FD*.

Figure 5:
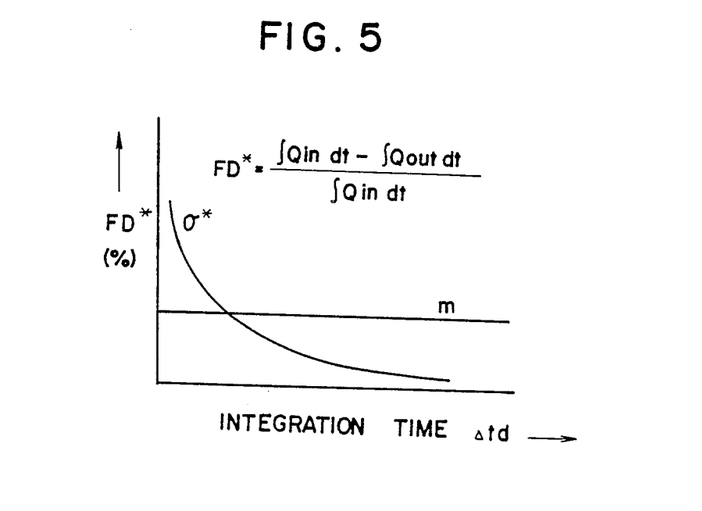
FIG. 5 is a graph showing the mean value and standard deviation of an FD*.

In FIG. 5, it is considered that the value of FD* approaches its mean value m with increase in the integration time $\Delta td$. The reason is that while the instrumental error, etc., included in the FD mean value m increase with increase in the integration time $\Delta td$, it is considered that the error always maintains a given ratio and hence it maintains a given ratio for the quantity of gas introduced into the whole pipe line. Also, as the integration time $\Delta td$ increases, the standard deviation value of FD attains a given value and the integrated inflow rate $\int Qindt$ (hereinafter referred to as $\Sigma Qin$) of the whole pipe line increases thus causing the ratio therebetween to tend to approach zero. Thus, it is apparent that the value of FD* gradually approaches its mean value m with increase in the integration time $\Delta td$. Here, it is assumed that the values of FD* have the similar normal distribution as in the case of FD.

FIG. 5 shows the relation between the mean value m and standard deviation $\sigma^*$ of FD* and the integration time $\Delta td$ in the case of a gas pipe line involving no occurrence of a gas leak and the values of FD* with 99.7% probability fall within $\pm 3 \sigma^*$ on either side of its mean value m.

Figure 6:
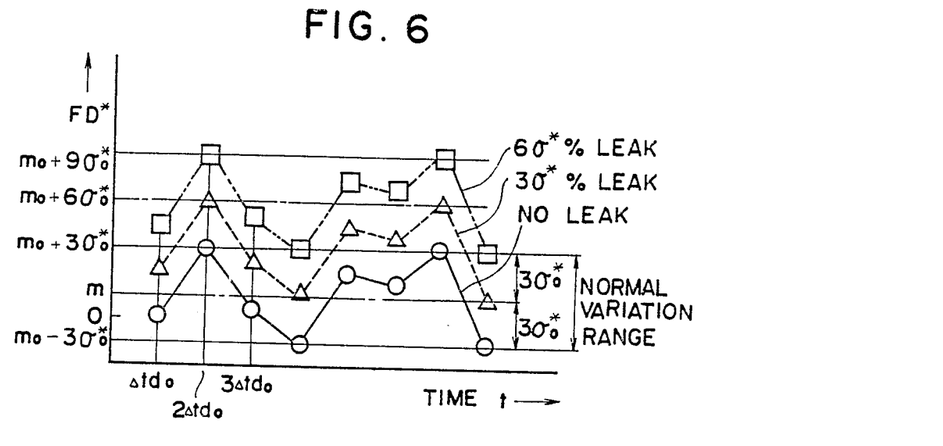
FIG. 6 is a graph showing FD* variations in the integration time $\Delta tdo$.

Assuming now that the FD* of a gas pipe line is measured with an integration time $\Delta tdo$, the normal FD* fluctuates with the probability of 99.7% within $m_o \pm 3\sigma_o^*$ as shown by the solid line in FIG. 6. If a gas leak of $3\sigma^*\%$ occurs in the pipe line, it is considered that in the case of the leakage FD*, its standard deviation remains unchanged and only its mean value makes a $3 \sigma^*\%$ parallel movement in contrast to the normal FD*. Thus, the 99.7% probability FD* varies within $(m_o+3\sigma_o)\pm 3\sigma_o$ and the value of FD* exceeds the line of $m_o+3\sigma_o^*$ with the probability of $49.85\% = 99.7/2$ (the broken line in FIG. 6). The values of FD* exceeding the line of $m_o+3\sigma_o^*$ are apparently abnormal as compared with the normal FD* variation $(m_o\pm 3\sigma_o^*)$ and this means the occurrence of a leak.

Thus, in the normal gas pipe line with no occurrence of any leak, a gas leak rate at which the value of FD* exceeds the variation limit $m_o \pm 3\sigma_o^*$ with the probability of 99.7% is $6\sigma_o^*\%$. (See the two-dot-chain line of FIG. 6).

The detectable leakage rates of the gas pipe line and its minimum flow integration time can be obtained from FIG. 5 and it will be seen that the leak detecting capacity increases with an increase in the integration time.

Figure 7:
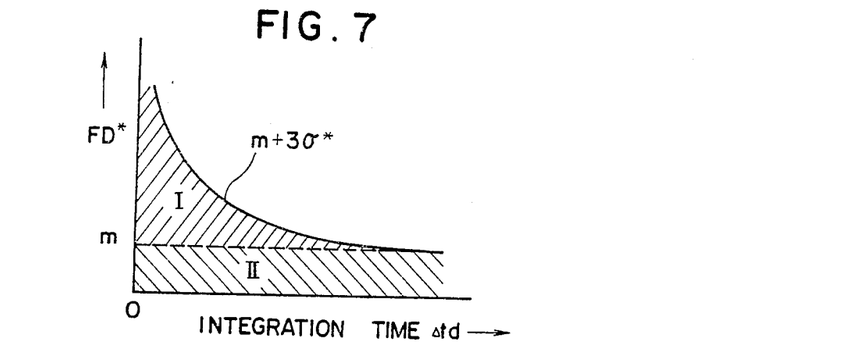
FIG. 7 is a graph showing an FD* variation limit.

Then, a consideration of the magnitude factors of FD* shows that these factors can be divided into types I and II as shown in FIG. 7.

The FD* factor of the type I mainly consists of a line packed gas quantity variation due to fluctuation of the inflow and outflow flow rates. This value decreases with increase in the integration time $\Delta td$.

The FD* factor of the type II mainly consists of one due to the instrumental error of the whole metering system mounted on the pipe line. Thus, this is not dependent on the integration time $\Delta td$ and it tends to assume a constant value.

Figure 8:
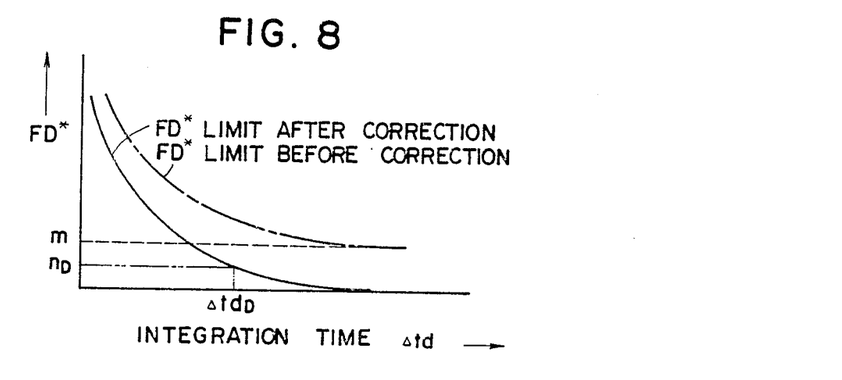
FIG. 8 is a graph showing a correction (99.7% limit) of the FD*.

Then, the type - I FD* factor is a value dependent on the operating conditions of the equipment and it is the magnitude of FD* which cannot be avoided. On the contrary, while the type - II FD* factor is a value determined by the specification (the types, numbers, etc., of the instrumentation devices), its value is considered to be maintained at a constant value and hence it is conceivable to correct the value in consideration of the instrumental error of the metering. Thus, the type - II FD* factor can be corrected in consideration of the instrumental error of the meters, etc. Assuming now that the mean value m of FD* is corrected, that is, if the mean value m is subtracted from the value of FD*, in FIG. 7 the values of FD* are transferred from the range of $m \pm 3 \sigma^*$ to a range of $\pm 3 \sigma$. This is shown in FIG. 8.

After the correction of the instrumental accuracy, the FD* limit that satisfies the probability of 99.7% decreases infinitely with increase in the integration time $\Delta td$ and the leak detecting capacity increases with increase in the integration time $\Delta td$. In practical use, however, simply increasing the integration time $\Delta td$ so as to increase the leak detecting capacity gives rise to problems in consideration of the data processing capacity for leak detection or the like. Thus, the integration time for the calculation of FD* is preset to a given integration time $\Delta td_D$ and the leak detecting capacity is reduced to $2nD\%$ thereby effecting the leak detection.

Figure 9A:
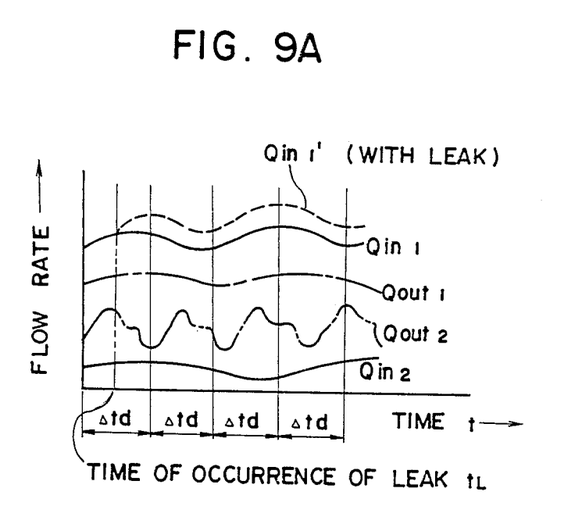
FIGS. 9A and 9B are graphs showing examples of the integration time determination.
Figure 9B:
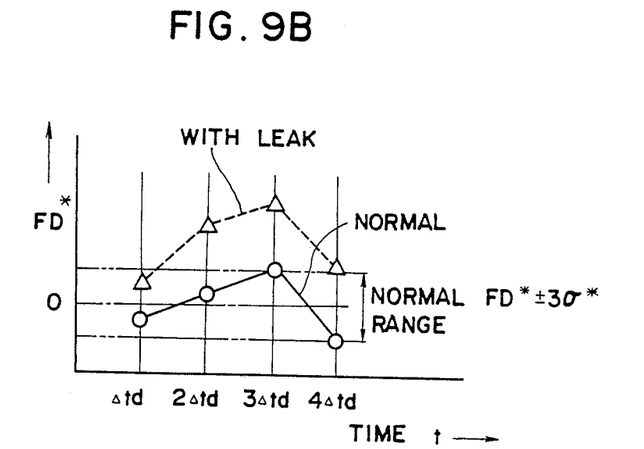

As regards the method of determining the integration time of FD* for detecting a gas leak with the leakage rate of $2nD\%$, firstly it is conceivable to determine the integration time as in FIGS. 9A and 9B.

It has been mentioned previously that when there is no occurrence of any leak, with the probability of 99.7%, the values of FD* during the integration time $\Delta td$ center in the range of $m \pm 3\sigma^*$ and that after the correction of the mean value m its leak detecting capacity becomes $6\sigma\%$. Assume now that a $6\sigma^*\%$ leak occurs at a time $t_L$ ($<\Delta td$) in the pipe line having the $6\sigma^*$ leak detecting capacity. At this time, the value of FD* is calculated at intervals of the time $\Delta td$ and thus it is apparent from FIGS. 9A and 9B that the time required for the value of FD*, upon the occurrence of the leak, to exceed the normal FD* variation range of $3\sigma^*\%$ with the probability of 99.7% is on and after a time 2 $\Delta td$. As a result, if this way of determining the integration time is used, it can be said that the leak is detected at the expiration of the minimum time $\Delta td$ or the maximum time $2 \Delta td$ after its occurrence.

This method requires a leak detecting time which is two times the integration time at the maximum. Thus, this delay of the leak detecting time is improved by the below-mentioned method.

Figure 10A:
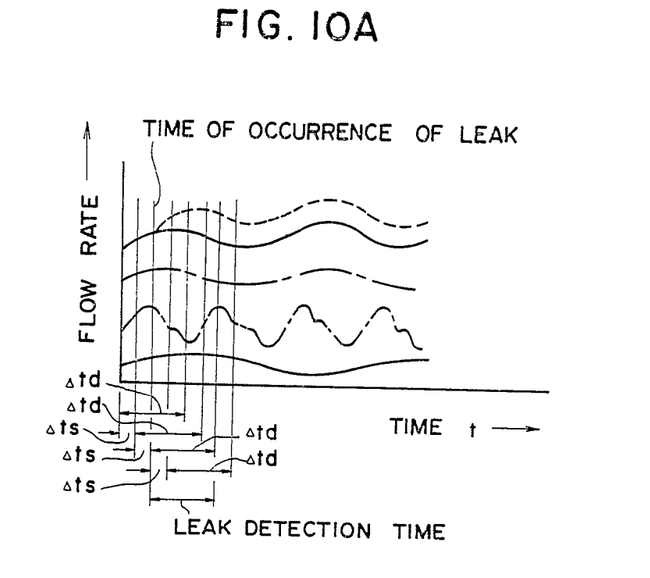
FIGS. 10A and 10B are graphs showing another examples of the integration time determination.
Figure 10B:
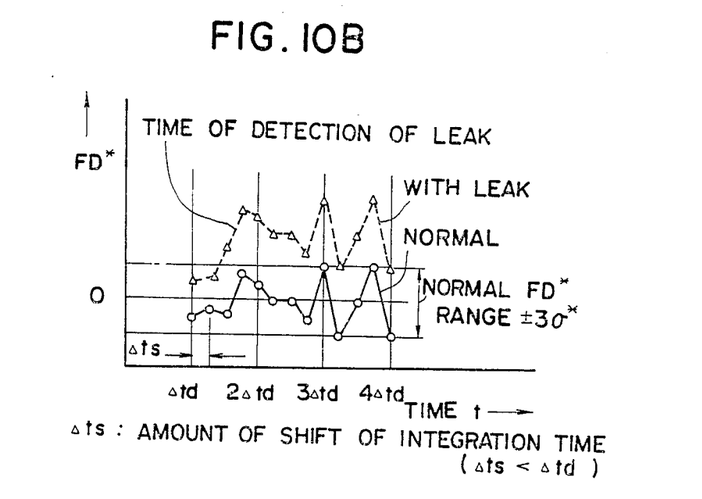

As shown in FIG. 10A, in accordance with this method the starting time of the integration is successively shifted by a time $\Delta ts$ and the value of FD* is integrated over the time $\Delta td$. In accordance with this technique, the occurrence of a leak (leakage rate of $6\sigma^*\%$) within the time $\Delta td$ is successively integrated over the integration time $\Delta td$ for each time $\Delta ts$ as shown in FIG. 10B, with the result that the occurrence of the leak is detected earlier and the leak detection time is decreased from the previously mentioned detection time ranging from the minimum of $\Delta td$ to the maximum of $2 \Delta td$ to a detection time ranging from the minimum of $\Delta td$ to the maximum of $(\Delta td + \Delta ts)$.

This technique has another advantage of further reducing the leak detection time when there occurs in the pipe line a leak which exceeds the leak detecting capacity of $6\sigma^*\%$ for the time $\Delta td$. The reason is as follows.

Figure 11:
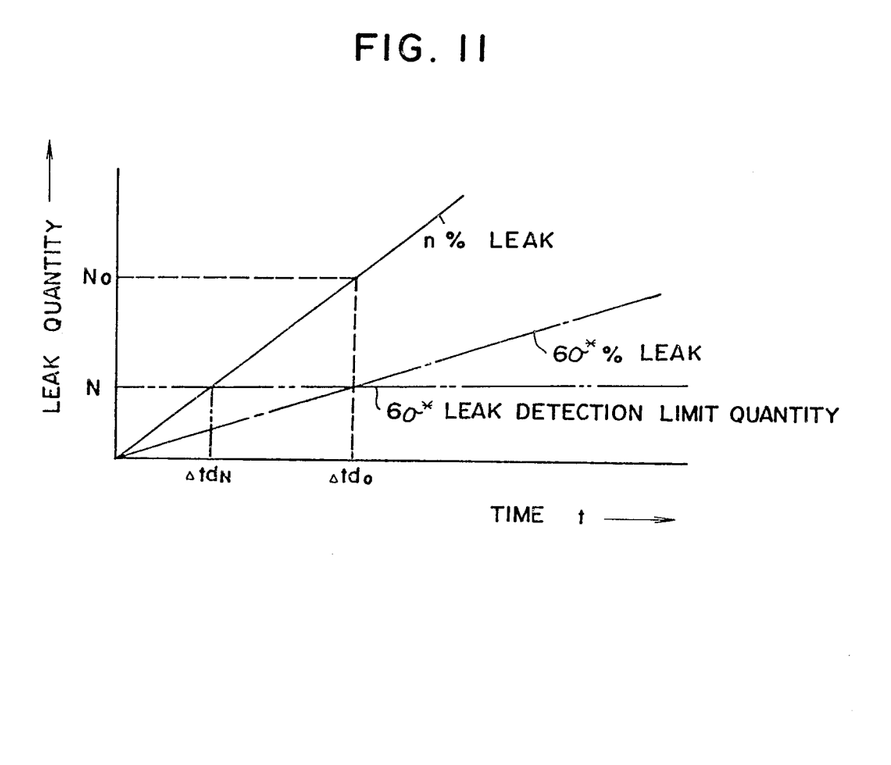
FIG. 11 is a graph showing the relation between the integration time and the amount of leakage.
Figure 12:
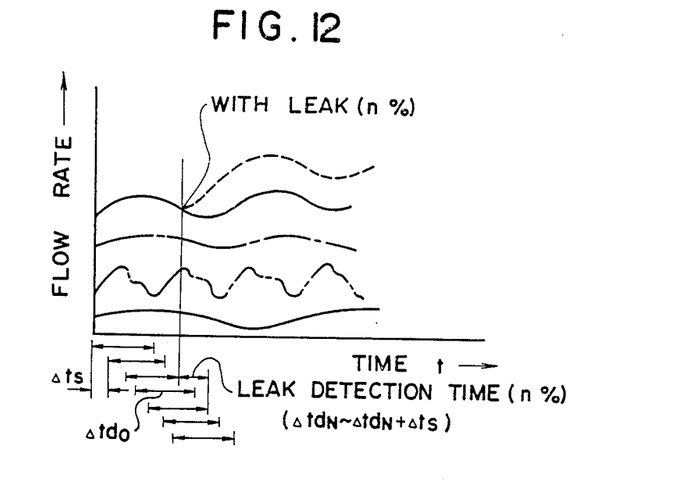
FIG. 12 is a graph showing the manner in which the detection time can be improved by change the manner to integrate the flow rate.

Assuming now that there occurs a leak of n % exceeding the leak detecting capacity of $6\sigma^*\%$ for the time $\Delta td$, the amount of leakage caused by the leak of n % during a time $\Delta td_o$ is $N_o$ (see FIG. 11). Since the value of $N_o$ is greater than the amount of gas integrated over the time $\Delta td$ for the $6\sigma^*\%$ leak, the amount of gas integrated with n % exceeds the limit quantity for $6\sigma^*\%$ in a time $\Delta td_N$ and thus it is apparent that an integration time of $\Delta td_N$ is sufficient for the amount of gas to reach the leak detection limit for the integration time $\Delta td_o$. The integration time $\Delta td_N$ is given by the following equation $$\Delta td_N = \frac{6\sigma^*}{n} \Delta td_o < \Delta td_o$$

Therefore, where a leak of n % ($>6\sigma^*\%$) occurs, if a flow integration is performed as in FIG. 10A, the leak detection time is reduced to one between the minimum of $\Delta td_N$ and the maximum of $(\Delta td_N + \Delta ts)$.

With this method, in order to handle the difference FD between the integrated flow rates in a gas pipe line in question, a flow meter is mounted at each of the gas inlets and outlets points (supply and demand ends) of the line, e.g., the points $1a_1$, $1a_2$, $1b_1$ and $1b_2$ in FIG. 1 and their measured flow rates are transmitted as data to an information processing unit, e.g., a computer installed at a centralized supervisory station thereby sequentially integrating the flow rates and detecting the occurrence of a gas leak.

On the other hand, in order to determine the leak detecting capacity and leak detection integration time of the line, it is necessary to know the FD* characteristic of the line. Since it is considered that the FD* characteristic varies greatly depending on the form, method of operation, number of supply and demand points, etc., of the line, the past flow data of the line on which the leak detection is to be effected are preliminarily obtained and subjected to statistical processing thus determining the relation between the FD* and the integration time. In accordance with the thus determined mean value and standard deviation value of the FD* relating to the integration time, the desired leak detecting capacity and integration time are determined.

Also, in order to improve the accuracy of the detecting capacity and the integration time, the reexamination of FD* is suitably effected and the FD* characteristics (see FIG. 5) are depicted again thereby renewing the leak detecting capacity and the integration time.

An embodiment of an apparatus according to the present invention will now be described.

Figure 13:
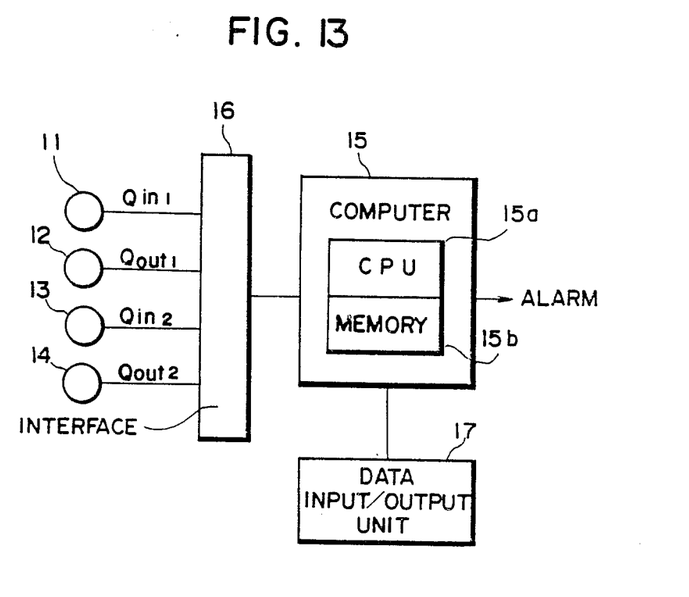
FIG. 13 is a block diagram of an apparatus for performing the method of this invention.

FIG. 13 illustrates a block diagram of an apparatus according to an embodiment of the invention. In the Figure, numeral 11 and 13 designate flow meters for measuring the inflow rates at inlets $1a_1$ and $1a_2$, respectively, and 12 and 14 flow meters for measuring the outflow rates at outlets $1b_1$ and $1b_2$, respectively. Numeral 15 designates a computer, 15a a central processing unit (CPU), 15b a memory, 16 an interface whereby the flow rates measured by the flow meters 11, 12, 13 and 14 are subjected to A/D conversion and then sent to be computer 15, and 17 a data input/output unit including a keyboard and a CRT display (CRT).

With the construction described above, the past flow data of a gas pipe line subjected to the detection of a leak are introduced through the input/output unit 17 so that the flow data are processed by the CPU 15a in accordance with the procecure described in connection with FIGS. 4, 5 and 8. The resulting data indicating the relation between the FD* and the integration time shown in FIG. 8 are stored in the memory 15b.

Then, to initiate the detection of a leak, the graph shown in FIG. 8 is read by the input/output unit 17 so that an integration time $\Delta td_D$ corresponding to a leakage rate $n_o$ to be detected is determined and the integration time $\Delta td_D$ and a shift amount $\Delta t_S$ are inputted thus applying a detection start instruction to the computer 15. Thus, the flow measurements of the flow meters are taken from instant to instant and they are then integrated over time. If the FD* limit after correction, shown in FIG. 8, is exceeded at the time that the integration time reaches the value of $\Delta td_D$, a gas leak alarm signal is generated.

A method according to another embodiment of the invention will now be described.

It has previously been described in connection with FIG. 7 that the fluctuating factors of FD* consist of the line pack FD* of the type I and the instrumental error FD* of the type II. Then, while type-II FD* is a problem due to the specification of the equipment and so it can be corrected easily, the type-I FD* is caused by a change in the operation of the equipment and thus it cannot be corrected easily. However, if a behavior of flow due to a change in the operation can be simulated by calculation, it is possible to correct the type-I FD*.

With the pipe line model of FIG. 1, if a model line is simulated using the inlet flow rates $Qin_1$ and $Qin_2$ as flow boundary conditions and the outlet pressure $Pout_1$ and $Pout_2$ as pressure boundary conditions, it is possible to obtain $Pin_1$, $Pin_2$, $Qout_1$ and $Qout_2$ as the simulated results.

Figure 14:
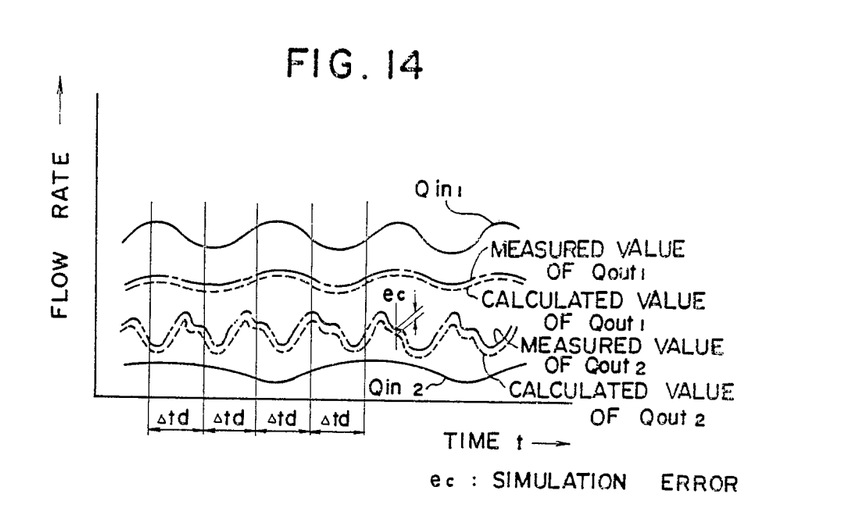
FIG. 14 is a graph showing flow variations by a simulation.

Assuming now that various adjustments are made to the simulation thus determining the optimum values, the resulting behaviors of flow at the respective supply and demand points become as shown in FIG. 14.

Figure 15:
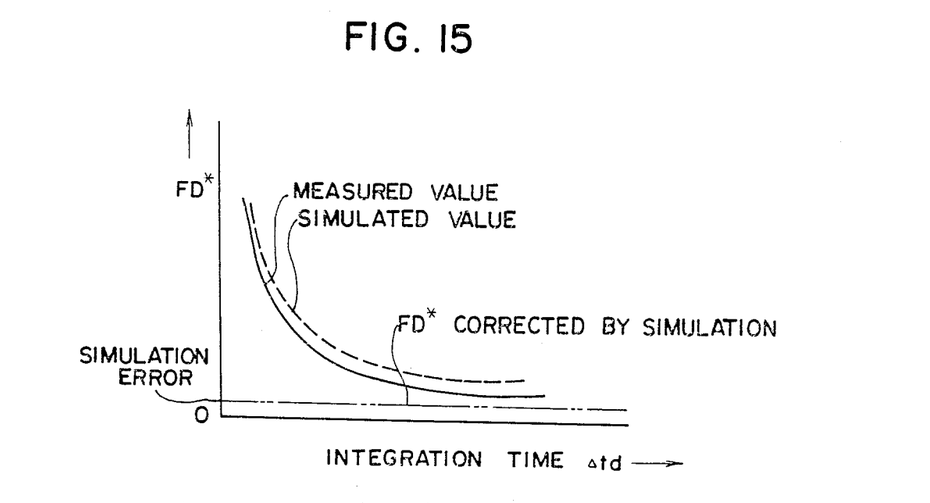
FIG. 15 is a graph showing an FD* obtained by a simulation correction.

It is considered that plotting a simulation FD* so as to satisfy the probability of 99.7% in accordance with the simulated results of FIG. 14 results as shown in FIG. 15 and the simulated values approximate the measured values.

Since the principal factors of the measured FD* consist of those due to the fluctuation of the line packed quantity, the instrumental error and the accuracy of simulation, if the measured FD* (FD* meas) is corrected in accordance with the simulated FD* (FD* cal), the resulting FD* (FD* com) includes only the factor due to the accuracy of simulation. This FD* com is given by the following equation FD*com = FD*meas − FD*cal (accuracy of simulation)

If the accuracy of simulation maintains a constant ratio to the integrated flow rate irrespective of the integration time $\Delta td$, it is presumed that the fluctuating range of the simulation-corrected FD*com is not restricted by the integration time and it is maintained at a constant value. Thus, differing from the leak detection effected by comparing the integrated flow rate difference as mentioned in connection with the previously mentioned mass balancing, to simulate the flow rates makes it possible to effect the leak detection through a comparison between the measured values of the momentary flow rates and the simulated values without any integration of the flow rates.

An apparatus according to another embodiment of the invention will now be described. The hardware construction of this apparatus is the same as shown in FIG. 13 and therefore the apparatus will be described on the basis of the construction shown in FIG. 13.

In the like manner as the previously described embodiment, the flow rates measured by the flow meters 11, 12, 13 and 14 are supplied to the computer 15 so that the necessary calculations are performed on the basis of the measured values in accordance with the procedure described in connection with FIGS. 4, 5 and 8 and the curve of the measured values shown in FIG. 15 is obtained. Simultaneously, an simulation as mentioned previously is performed by the computer 15 and the curve of the simulated values shown in FIG. 15 is obtained.

The difference between the two curves is obtained at all times so that when the difference exceeds a predetermined value, the occurrence of a gas leak is determined and an alarm signal is generated.

It is to be noted that the simulation is performed in accordance with the following fundamental equations which describe the transient behavior of a fluid in the pipe element portions, that is, the mass conservation equation, the momentum conservation equation, the energy conservation equation and the equation of state or their simplified equations $$\frac{\partial}{\partial t}\rho + \frac{\partial}{\partial x}\rho U = -\frac{\rho U}{F} \cdot \frac{dF}{dx}$$

$$\frac{\partial}{\partial t}\rho U + \frac{\partial}{\partial x}(\rho U^2 + P) = -\rho(f + g\cos\phi) - \frac{\rho U^2}{F}\frac{dF}{dx}$$

$$\frac{\partial}{\partial t}\rho\left(e + \frac{U^2}{2}\right) + \frac{\partial}{\partial x}\rho U\left(H + \frac{U^2}{2}\right) =$$

$$\rho(Q - Ug\cos\phi) - \frac{\rho U\left(H + \frac{U^2}{2}\right)}{F}\frac{dF}{dX}$$

-continued $$\rho = \frac{P}{RT} \quad C_p = \frac{K}{K-1} R \text{ (in the case of an ideal gas)}$$

where $x$ = coordinate along pipe line
$t$ = time
$\rho$ = density
$e$ = specific internal energy
$U$ = velocity
$H$ = specific enthalpy
$F$ = cross-sectional area of flow path
$Q$ = heat quantity supplied
$P$ = pressure
$R$ = gas constant
$f$ = friction force
$C_p$ = specific heat at constant pressure
$g \cos\phi$ = gravity
$K$ = ratio of specific heats In these fundamental equations, changes of the pipe cross-sectional area are taken into consideration and the forces acting on the fluid include the following: (1) pressure, (2) friction force, (3) gravity and (4) reaction from pipe wall.

The following are taken into consideration as the transferred energies: (1) pressure energy, (2) heat energy supplied from the external system, (3) gravity energy, and (4) internal energy change due to the varying cross-sectional area.

What is claimed is:

1. A leak detecting method for a gas pipe line wherein when measuring from instant to instant an inflow rate Qin and an outflow rate Qout at each of all inlets and outlets of said gas pipe line, integrating said inflow rates Qin and said outflow rates Qout, respectively, over a predetermined period of time and determining the occurence of a gas leak when a sum $\Sigma \int Qdt$ ($= \Sigma \int Q$indt $- \Sigma \int Q$outdt) of said integrated values deviates from a predetermined value, in accordance with data obtained by integrating a relation between the integration time and a standard deviation of ($\Sigma \int Q$indt$-\Sigma \int Q$outdt)/$\Sigma \int Q$indt whereby an integration time T corresponding to a rate of leakage to be detected is determined from said relation and an integration over time is performed from each of a plurality of time instants shifted from each other by an integral fraction of said integration time T thereby making said determination of a leak each time said integration time T is reached.

2. A leak detecting apparatus for a gas pipe line comprising; a flow meter arranged at each of all inlets and outlets of a gas pipe line to measure from instant to instant an inflow rate Qin and an outflow rate Qout thereat; and computing means for receiving data measured by said flow meters, integrating said inflow rates Qin and said outflow rates, Qout respectively, over a predetermined period of time and calculating a sum $\Sigma \int Qdt$ of said integrated values, calculating a relation between the integration time and a standard deviation of ($\Sigma \int Q$indt$-\Sigma \int Q$outdt)/$\Sigma \int Q$indt in accordance with a result of the calculation of said sum, determining an integration time T corresponding to a rate of leakage to be detected from said calculated relation, and performing an integration over time from each of a plurality of time instants shifted from each other by an integral fraction of said integration time T whereby an alarm signal is generated when said sum $\Sigma \int Qdt$ ($\Sigma \int$ dindt$-\Sigma \int$ doutdt) deviates from a predetermined value upon reaching said integration time T.

3. A leak detecting apparatus for a gas pipe line according to claim 2, wherein computing means includes a CPU, a memory, an interface and a data input/output unit.

* * * * *